United States Patent
Sottiaux et al.

(10) Patent No.: US 9,771,974 B2
(45) Date of Patent: Sep. 26, 2017

(54) BEARING WITH A SHAPE MEMORY ALLOY COMPONENT

(75) Inventors: Daniel P. Sottiaux, Flower Mound, TX (US); Frank B. Stamps, Colleyville, TX (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 719 days.

(21) Appl. No.: 13/596,588

(22) Filed: Aug. 28, 2012

(65) Prior Publication Data
US 2014/0248011 A1    Sep. 4, 2014

Related U.S. Application Data

(60) Provisional application No. 61/542,634, filed on Oct. 3, 2011.

(51) Int. Cl.
| | |
|---|---|
| *F16F 1/41* | (2006.01) |
| *F16C 17/22* | (2006.01) |
| *F16C 27/06* | (2006.01) |
| *F03G 7/06* | (2006.01) |
| *F16F 1/38* | (2006.01) |

(52) U.S. Cl.
CPC .............. *F16C 17/22* (2013.01); *F03G 7/065* (2013.01); *F16C 27/06* (2013.01); *F16C 2202/28* (2013.01); *F16F 1/3842* (2013.01)

(58) Field of Classification Search
CPC ........... F16F 1/3615; F16F 1/3842; F16F 1/41
USPC ................ 267/294, 141.1, 141.2; 384/221
See application file for complete search history.

(56) References Cited

U.S. PATENT DOCUMENTS

| | | | | |
|---|---|---|---|---|
| 3,787,102 | A  * | 1/1974 | Moran ..................... | 384/221 |
| 4,324,441 | A  * | 4/1982 | Rouverol et al. ........... | 384/492 |
| 4,714,450 | A  * | 12/1987 | Byrnes et al. ............. | 464/90 |
| 5,120,175 | A  * | 6/1992 | Arbegast et al. ........... | 411/501 |
| 5,186,686 | A | 2/1993 | Staples et al. | |
| 7,096,740 | B2 * | 8/2006 | Wilkerson et al. ......... | 73/761 |
| 8,298,656 | B2 * | 10/2012 | Schneider ................. | 428/292.1 |
| 2005/0272509 | A1 * | 12/2005 | Rivin ........................ | 464/136 |
| 2009/0190868 | A1 * | 7/2009 | Kane ........................ | 384/42 |
| 2013/0061423 | A1 * | 3/2013 | Ahern et al. .............. | 16/2.1 |

FOREIGN PATENT DOCUMENTS

| | | |
|---|---|---|
| CN | 1910385 A | 2/2007 |
| CN | 2883762 Y | 3/2007 |
| CN | 101415959 A | 4/2009 |
| CN | 101936337 A | 1/2011 |
| EP | 0456384 A1 | 11/1991 |
| EP | 0458004 A1 | 11/1991 |
| EP | 2028434 B1 | 5/2012 |

(Continued)

OTHER PUBLICATIONS

European Search Report in related European Application No. 112185020.0, dated Jan. 16, 2013, 7 pages.

(Continued)

*Primary Examiner* — Bradley King
(74) *Attorney, Agent, or Firm* — Lightfoot & Alford PLLC

(57) ABSTRACT

The bearing assembly includes one or more elastomeric members loaded in a precompression by a shim that includes a shape memory alloy. The shape memory alloy is configured to generate the precompression in the elastomeric members upon a temperature change.

16 Claims, 2 Drawing Sheets

(56) References Cited

FOREIGN PATENT DOCUMENTS

| JP | 6010946 A | 1/1994 |
|----|-----------|--------|
| JP | 6200933 A | 7/1994 |
| JP | 2010169120 A | 8/2010 |
| WO | 2008106952 A1 | 9/2008 |

OTHER PUBLICATIONS

Chinese First Office Action in related Chinese Application No. 201210370709.1, dated Aug. 29, 2014, 13 pages.
Canadian Notice of Allowance in related Canadian Application No. 2,790,846, dated Nov. 17, 2014, 1 page.
Notice of Grant in related Chinese Application No. 201210370709.1, dated Apr. 24, 2015, 4 pages.

\* cited by examiner

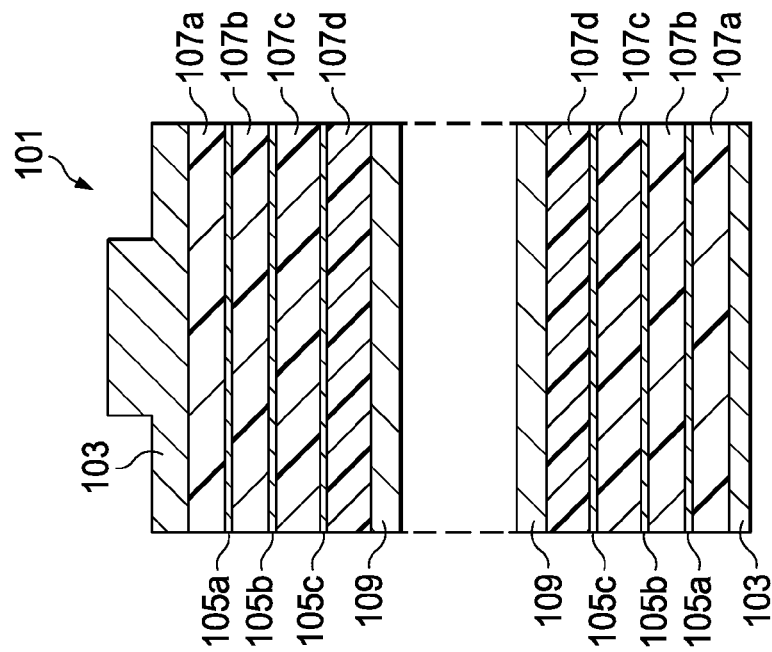
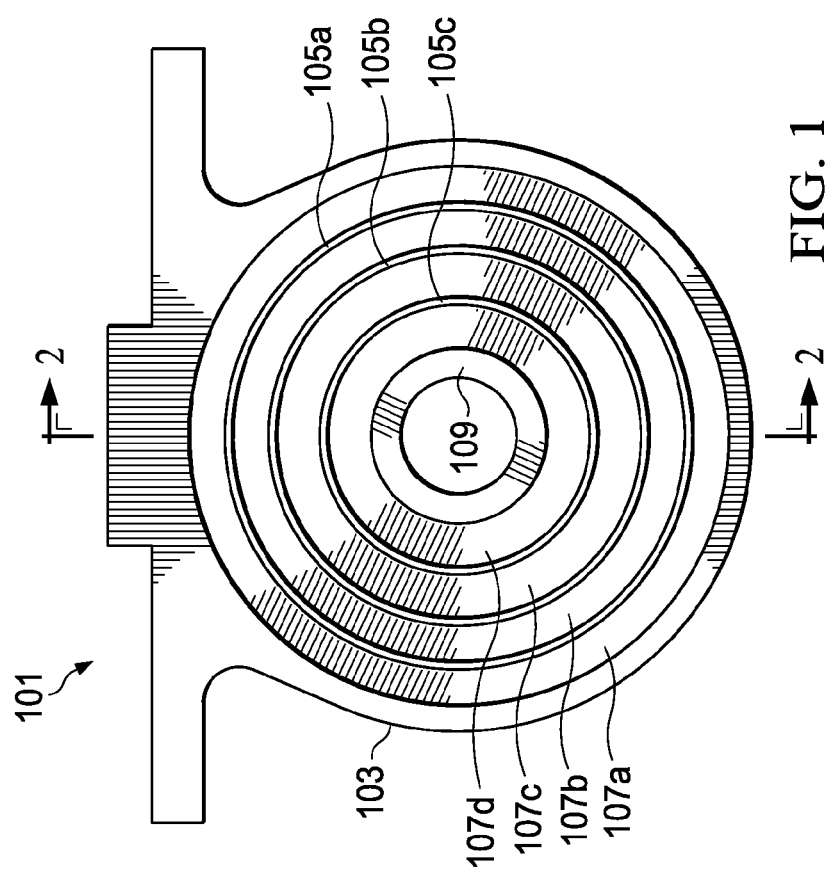

BEARING WITH A SHAPE MEMORY ALLOY COMPONENT

BACKGROUND

Technical Field

The method and apparatus of the present application relates to a bearing. The bearing can be used on a helicopter, for example.

Description of Related Art

Certain bearings, such as elastomeric bearings, use alternating layers of metal shims and layers of elastomeric material. During fabrication of the bearing, considerable effort is made to install the layers elastomeric material so that each layer is in precompression. In some bearings, a lower grade of elastomeric material so that the elastomeric portions can be squeezed into the bearing geometry.

Hence, there is a need for an improved bearing, and method of manufacturing the bearing.

DESCRIPTION OF THE DRAWINGS

The novel features believed characteristic of the method and apparatus of the present application are set forth in the appended claims. However, the method and apparatus itself, as well as a preferred mode of use, and further objectives and advantages thereof, will best be understood by reference to the following detailed description when read in conjunction with the accompanying drawings, wherein:

FIG. 1 is a front view of a bearing assembly, according to an illustrative embodiment of the present application;

FIG. 2 is a cross-sectional view of a the bearing assembly, taken at section lines 2-2 in FIG. 1, according to the illustrative embodiment of the present application.

DESCRIPTION OF THE PREFERRED EMBODIMENT

Figure 3:
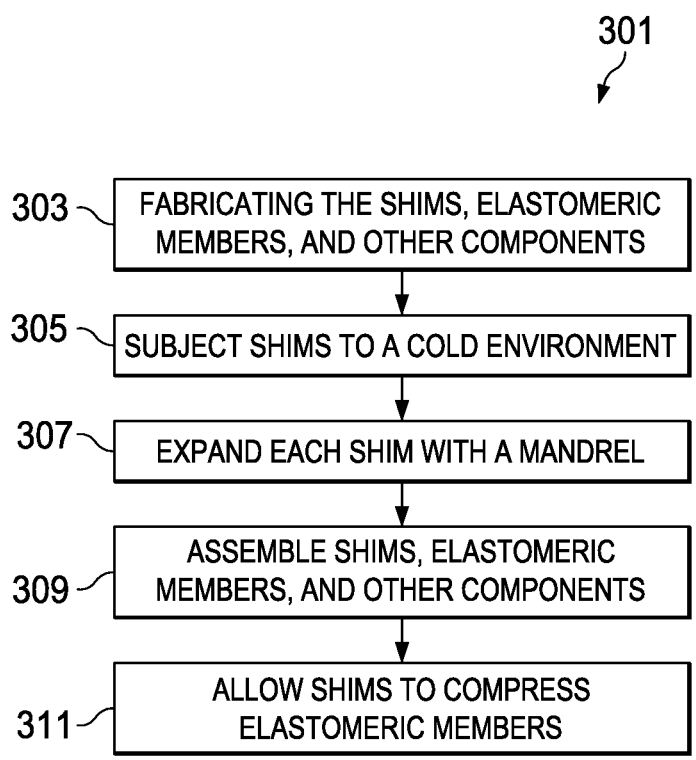
FIG. 3 is a schematic view of a method of manufacturing the bearing assembly, according to an illustrative embodiment of the present application.

Illustrative embodiments of the apparatus and method are described below. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The apparatus of the present application includes a bearing having one or more elastomeric members in a precompression loading by a shim that includes a shape memory alloy. The shape memory alloy shim is configured to generate the precompression upon a temperature change. The method of the present application includes manufacturing a bearing by utilizing a shape memory alloy shim to apply a precompression to the elastomeric members.

Referring to FIGS. 1 and 2, an exemplary bearing assembly 101 is illustrated. Bearing assembly 101 can include a housing 103, a plurality of shims 105a-105c, a plurality of elastomeric members 107a-107d, and an inner bearing member 109. Each shim 105a-105c includes a shape memory alloy that is configured to produce a compression preload force upon the inwardly adjacent elastomeric member 107b-107d. For example, shim 105a imparts compression in elastomeric member 107b. Similarly, shim 105b imparts compression in elastomeric member 107c. Further, shim 105c imparts compression in elastomeric member 107d. The precompression force on the elastomeric members helps to extend its life by reducing indirect shear stress.

Each shim 105a-105c includes a shape memory alloy that causes the shims 105a-105c to constrict when subjected to an increase in temperature. Each shim 105a-105c is preferably in a cylindrical shape. However, bearing assembly 101 may include shims and elastomeric members of other shapes as well. Further, it should be appreciated that bearing assembly 101 may include any number shims and elastomeric members.

Referring to FIG. 3, a method 301 of manufacturing bearing assembly 101 is schematically illustrated. In a step 303, the elastomeric members 107a-107d are preferably molded, but elastomeric members 107a-107d can be manufactured in accordance with other methods as well. Further in step 303, housing 103 and inner bearing member 109 are fabricated. Housing 103 and inner bearing member 109 preferably include a rigid metal material and may be manufactured in accordance with a variety of methods known in the art. Further in step 303, each shim 105a-105c is fabricated. Each shim 105a-105c preferably includes a shape memory alloy that causes the size and shape of the part to return to predetermined original shape when subjected to heat. As such, each shim 105a-105c is fabricated such that the ambient temperature size and shape is slightly smaller than the elastomeric member located inwardly adjacent. A variety of shape memory alloys, which are known in the art, are acceptable in the composition of shims 105a-105c. For example, a shape memory alloy containing a nickel/titanium alloy can be used in shims 105a-105c.

Method 301 continues with a step 305 which includes subjecting shims 105a-105c to a cold environment. A step 307 can include expanding each shim 105a-105c with a mandrel. The combination of the cold environment and expanding pressure from the mandrel causes the shims 105a-105c to expand.

Method 301 continues with a step 309 of assembling shims 105a-105c, elastomeric members 107a-107d, along with inner bearing member 109. Adhesive can be used to secure each shim with an adjacent elastomeric member. For example, elastomeric member 107d can be adhesively bonded to inner bearing member 109 and shim 105c. Similarly, elastomeric member 107c can be adhesively bonded to shim 105c and shim 105b. Further, elastomeric member 107b can be adhesively bonded to shim 105b and shim 105a.

Method 301 continues with a step 311 for allowing the shims to compress the elastomeric members. As the parts are allowed to warm, shims 105a-105c constrict due to the shape memory alloy material. As the shims 105a-105c constrict, the elastomeric members 107b-107d compress. Once the shims 105a-105c have fully constricted, the remaining elastomeric member 107a can be pressed and bonded into the gap between housing 103 and shim 105a. In some embodiments, heat can be applied to facilitate the return of shims 105a-105c to their original shape, thus applying a constricting force.

The method and apparatus of the present application provides significant advantages, including: 1) providing a more cost efficient manufacturing technique for generating precompression in the elastomeric members; 2) providing a method of manufacturing that enables a higher grade of elastomeric material to be used; and 3) providing more uniform precompression across the elastomeric members.

The particular embodiments disclosed above are illustrative only, as the method and apparatus may be modified and practiced in different but equivalent manners apparent to those skilled in the art having the benefit of the teachings herein. Modifications, additions, or omissions may be made to the method and apparatus described herein without departing from the scope of the invention. The components of the apparatus may be integrated or separated. The steps of the method may be integrated or separated. Moreover, the operations of the apparatus may be performed by more, fewer, or other components.

Furthermore, no limitations are intended to the details of construction or design herein shown, other than as described in the claims below. It is therefore evident that the particular embodiments disclosed above may be altered or modified and all such variations are considered within the scope and spirit of the application. Accordingly, the protection sought herein is as set forth in the claims below.

To aid the Patent Office, and any readers of any patent issued on this application in interpreting the claims appended hereto, applicants wish to note that they do not intend any of the appended claims to invoke paragraph 6 of 35 U.S.C. §112 as it exists on the date of filing hereof unless the words "means for" or "step for" are explicitly used in the particular claim.

The invention claimed is:

1. A bearing assembly comprising:
   a housing;
   an inner bearing member;
   a first elastomeric member having an inner diameter surface and an outer diameter surface defining a thickness therebetween;
   a shim that includes a shape memory alloy that is configured to apply a compressive force on the first elastomeric member by compressing the first elastomeric member when subjected to a temperature change thereby reducing the thickness by compressively translating the outer diameter surface towards the inner diameter surface, the shim being located adjacent to the outer diameter surface of the first elastomeric member;
   a second elastomeric member located between the shim and an inner surface of the housing.

2. The bearing assembly according to claim 1, further comprising: an adhesive layer between the shim and the first elastomeric member.

3. The bearing assembly according to claim 1, wherein the shim is approximately cylindrically shaped.

4. The bearing assembly according to claim 1, wherein the inner bearing member is approximately cylindrically shaped.

5. The bearing assembly according to claim 1, wherein the temperature change is an increase in temperature.

6. The bearing assembly according to claim 1, wherein the shape memory alloy includes a nickel/titanium alloy.

7. A bearing assembly comprising:
   a housing;
   an inner bearing member;
   a first elastomeric member having a first inner diameter surface and a first outer diameter surface defining a first thickness therebetween;
   a second elastomeric member having a second inner diameter surface and a second outer diameter surface defining a second thickness therebetween;
   a first shim including a first shape memory alloy that is configured to apply a first compressive force on the first elastomeric member by compressing the first thickness of the first elastomeric member when subjected to a first temperature change, thereby reducing the first thickness by compressively translating the first outer diameter surface towards the first inner diameter surface, the first inner diameter surface being adjacent to the inner bearing member, the first shim being located adjacent to the first outer diameter surface of the first elastomeric member;
   a second shim including a second shape memory alloy that is configured to apply a second compressive force on the second elastomeric member by compressing the second thickness of the second elastomeric member when subjected to a second temperature change, thereby reducing the second thickness by compressively translating the second outer diameter surface towards the second inner diameter surface, the second inner diameter surface being adjacent to the first outer diameter of the first shim.

8. The bearing assembly according to claim 7, wherein the first temperature change is an increase in temperature.

9. The bearing assembly according to claim 7, wherein the first elastomeric member, the second elastomeric member, the first shim, and the second shim are approximately cylindrically shaped.

10. The bearing assembly according to claim 7, further comprising:
    an adhesive layer between the first shim and the first elastomeric member.

11. A method of manufacturing a bearing assembly, the method comprising the steps of:
    providing an inner member, a housing, a shim comprised of a shape memory alloy, a first elastomeric member and a second elastomeric member, the first elastomeric member having an inner diameter surface and an outer diameter surface defining a thickness therebetween, the shim being located adjacent to the outer diameter surface of the first elastomeric member;
    cooling the shim;
    assembling the inner member, the housing, the shim, the first elastomeric member and the second elastomeric member, wherein the second elastomeric member is located between the shim and an inner surface of the housing; and
    heating the shim, thereby causing the shim to compress the first elastomeric member, thereby reducing the thickness of the first elastomeric member by compressively translating the outer diameter surface towards the inner diameter surface.

12. The method according to claim 11, further comprising the step of: applying an adhesive between the shim and the first elastomeric member.

13. The method according to claim 12, further comprising the step of:
expanding the shim with a mandrel in conjunction with the step of cooling the shim.

14. The method according to claim 11, wherein the shape memory alloy is a nickel/titanium alloy.

15. The method according to claim 11, wherein the shim is approximately cylindrical.

16. The method according to claim 11, wherein the step of providing the shim and the first elastomeric member includes providing the first elastomeric member at a larger size and shape than the shim.

* * * * *